(Model.)
M. CAHILL.
HARROW ATTACHMENT.
No. 260,002. Patented June 27, 1882.
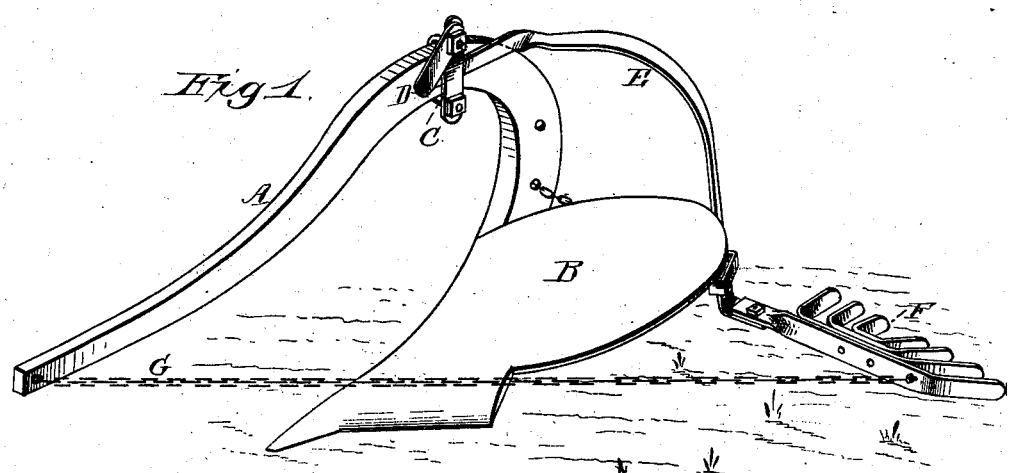
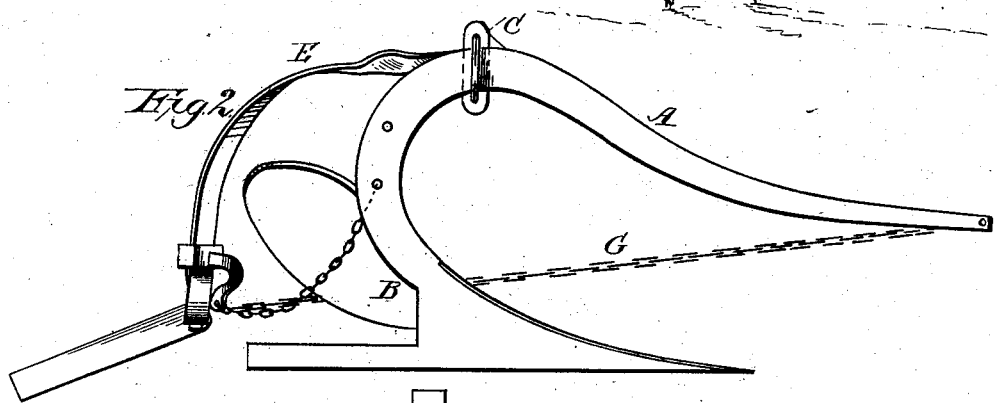
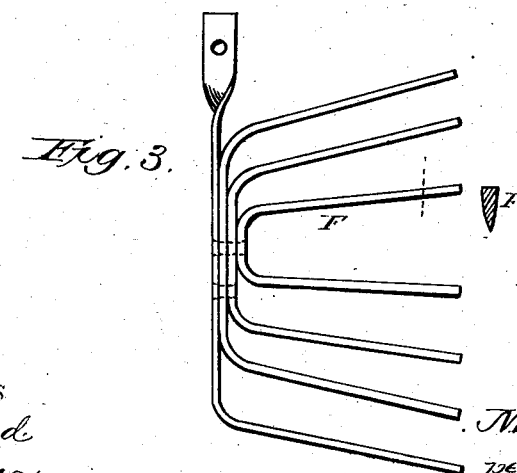
WITNESSES
F. L. Ourand
L. L. Miller
INVENTOR
Mortimer Cahill,
per Chas. H. Fowler
Attorney.

UNITED STATES PATENT OFFICE.

MORTIMER CAHILL, OF JACKSONVILLE, ILLINOIS.

HARROW ATTACHMENT.

SPECIFICATION forming part of Letters Patent No. 260,002, dated June 27, 1882.

Application filed March 7, 1882. (Model.)

*To all whom it may concern:*

Be it known that I, MORTIMER CAHILL, a citizen of the United States, residing at Jacksonville, in the county of Morgan and State of Illinois, have invented certain new and useful Improvements in Harrow Attachments to Plows; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a side elevation, and Fig. 3 a detail view of the harrow.

The present invention has relation to certain new and useful improvements in that class of harrows adapted for attachment to the beam or standard of a plow; and the object thereof is to so construct and arrange the teeth of the harrow that increased strength and durability are obtained, and the clods and soil turned up, cut, and thoroughly pulverized, and all trash and stubble will be turned under the surface of the ground. These objects I attain by the construction substantially as shown in the drawings, and hereinafter described.

In the accompanying drawings, A represents the plow-beam, and B the plowshare and mold-board, of the ordinary construction. A clip, C, is secured to the plow-beam of any ordinary style, the beam being constructed of steel, iron, or other suitable material. The harrow-beam E is also constructed of any suitable material, its end setting between one side of the clip C and plow-beam A and pivoted to one end of a link, D. Any other suitable means may be employed for connecting the harrow-beam to the plow-beam, and also the harrow to the beam E, as found most desirable, any of the ordinary means usually employed being sufficient so long as the harrow is held rigid and prevented from dragging endwise. In the present instance I have shown a chain, G, suitably connected to the harrow and beam of the plow, this being a common means in this class of harrow attachments to hold the harrow against turning when connected to the beam E, as shown. These several changes, however, may be made without affecting the essence of my invention, which consists in the peculiar construction of the harrow and the angle to which it is disposed with relation to the surface of the ground.

The harrow F is constructed of a series of flat metallic bars, preferably steel, bent as clearly indicated in Fig. 3 of the drawings, and secured together by bolts or otherwise. The ends of the bars forming the harrow F flare outwardly, so as to impel the earth thrown up by the plow laterally and cover up the stubble and trash. The ends of the bars are formed with knife-edges upon their under side, in order to cut the earth and clods thrown up by the plow and thoroughly pulverize the same.

The members of the harrow lie in about the position indicated in Fig. 2, so that they will be drawn over the soil instead of through it, as is the case of the vertical teeth generally used, and, being constructed with knife-edges, they will cut and pulverize the soil and clods turned up by the plow, and, as they flare outwardly to each side, will distribute the soil laterally, so as to cover up stubble and trash, instead of raking it up and leaving it upon the surface.

Each pair of bars forming the members of the harrow is formed from a single piece of metal bent as shown in Fig. 3, thereby giving greater strength and firmness, also rigidity, rendering them less liable to work loose or twist out of shape, and also enabling the arms or members to be connected and fastened together with less difficulty and with a less number of screws, rivets, bolts, or other like fastenings, thus producing a very cheap, durable, and effective harrow.

The peculiar construction of the harrow arms or members and their position with relation to each other remove the danger of their collecting dirt and becoming clogged.

Having now fully described my invention, what I claim as new, and desire to secure by Letters Patent, is—

1. The combination, with a plow, of the harrow formed of a series of metallic bars of unequal length, and bent as shown, their central portions secured together by bolts or otherwise, and having their ends arranged so as to flare laterally in an outward direction, and formed with knife-edges, substantially as and for the purpose set forth.

2. The combination, with a plow, of the harrow arranged and attached substantially as shown and described, said harrow being constructed of metallic bars bent as shown, and secured together centrally, and having their ends flaring laterally in an outward direction, substantially as and for the purpose set forth.

In testimony that I claim the above I have hereunto subscribed my name in the presence of two witnesses.

MORTIMER CAHILL.

Witnesses:
 GEORGE R. KELLY,
 WM. A. CULLER.